UNITED STATES PATENT OFFICE.

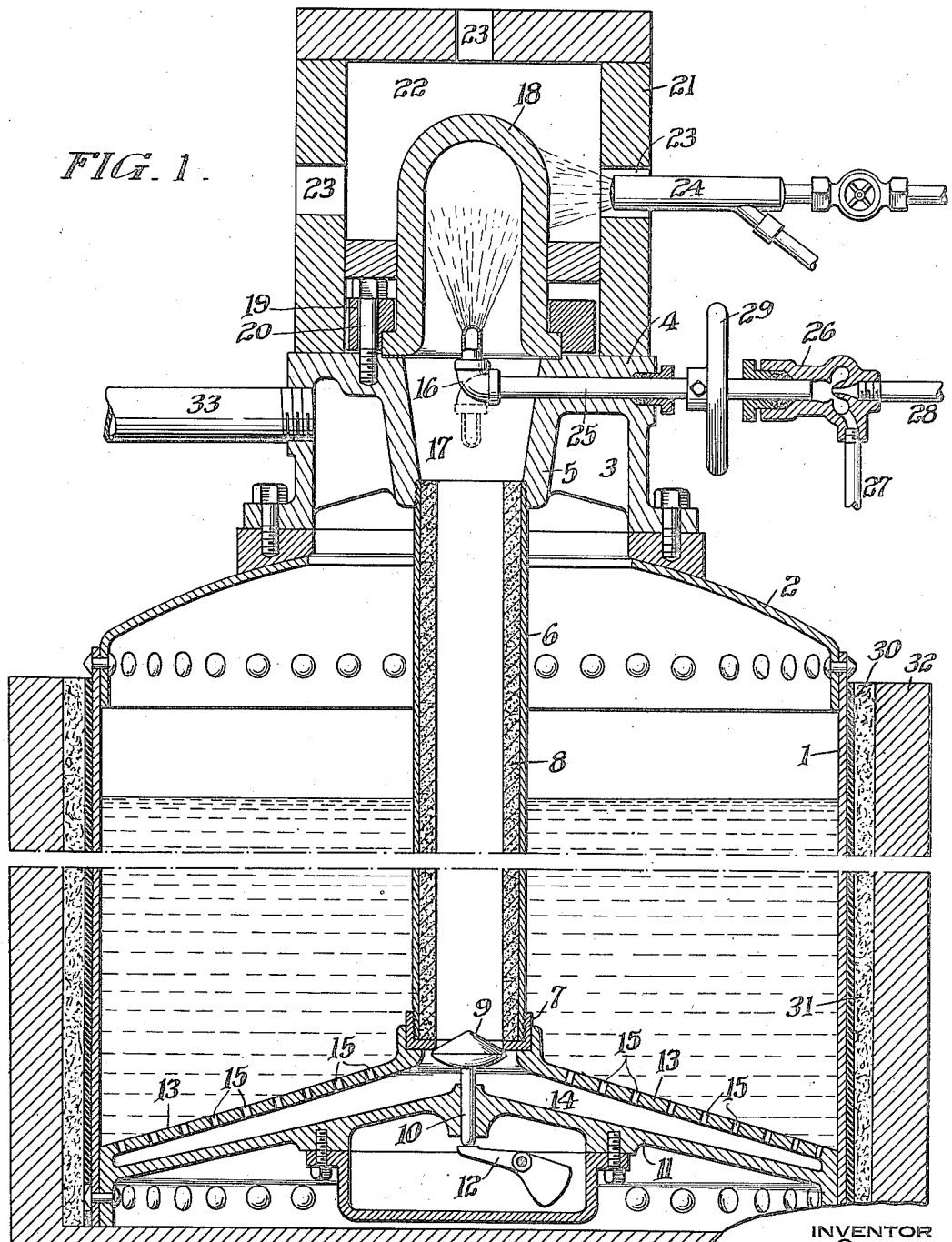

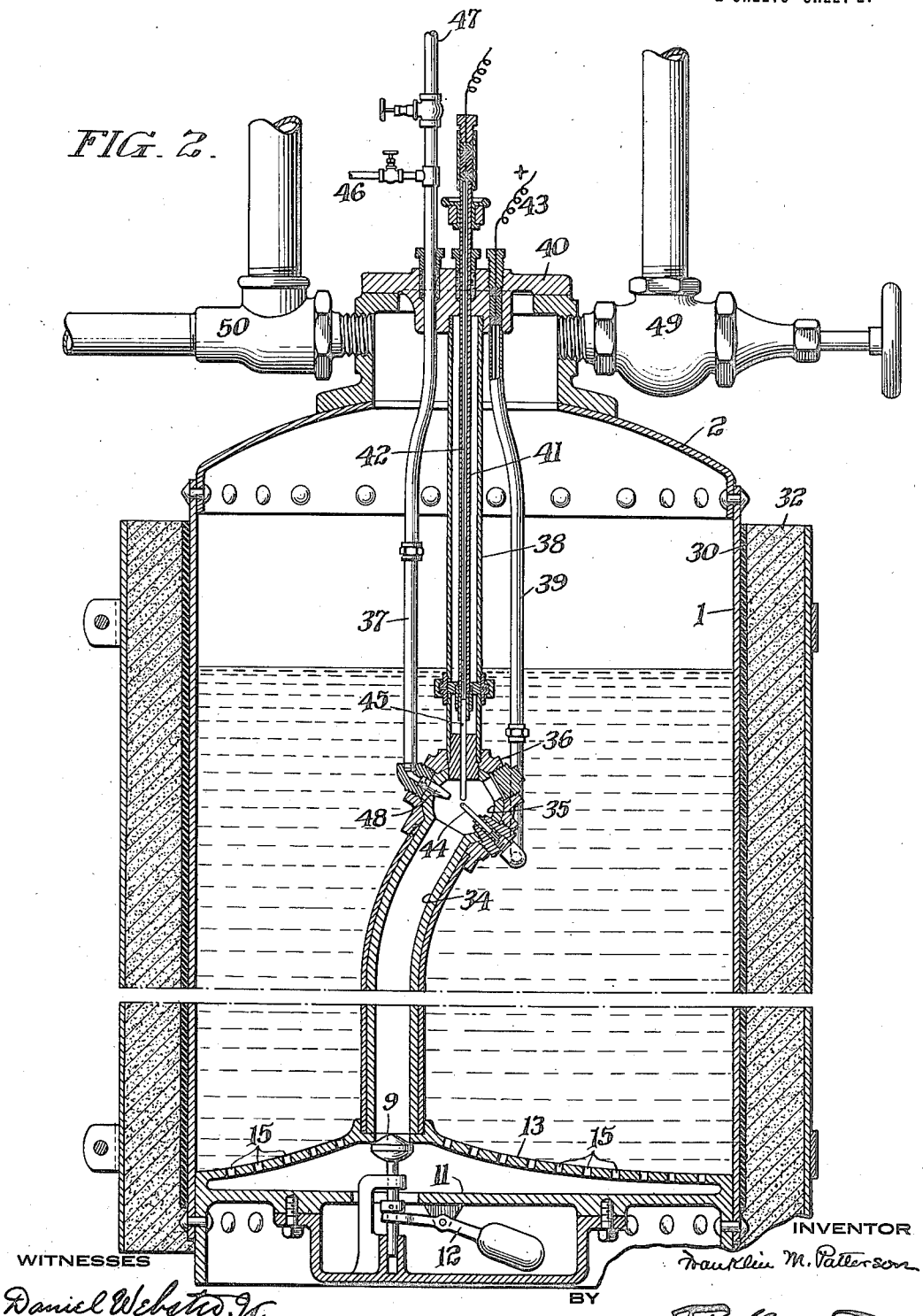

FRANKLIN M. PATTERSON, OF JERSEY CITY, NEW JERSEY, ASSIGNOR, BY MESNE ASSIGNMENTS, TO EVERLASTING VALVE COMPANY, A CORPORATION OF NEW JERSEY.

INTERNAL-COMBUSTION STEAM-GENERATOR.

1,253,522. Specification of Letters Patent. Patented Jan. 15, 1918.

Application filed October 18, 1915. Serial No. 56,422.

*To all whom it may concern:*

Be it known that I, FRANKLIN M. PATTERSON, a citizen of the United States, and resident of Jersey City, county of Hudson, and State of New Jersey, have invented an Improvement in Internal - Combustion Steam-Generators, of which the following is a specification.

This invention relates to method and means for generating mixtures of steam and gases by internal combustion, and has for an object to provide a boiler or generator suitable for internal combustion wherein substantially all of the heat units contained within the burning products are available for converting the water into steam. It has for a further object to provide an internal combustion generator wherein a hydrocarbon mixture is burned under pressure in an inclosed chamber and the heated products so produced therein passed into and through a body of water to generate steam.

It has for a further object to provide a means for retaining, within the generator, energy capable of vaporizing water, which has heretofore escaped through the shell of the generator in the form of radio-active rays or rays of like character, and thus utilize a hitherto unavailable source of heat.

In the general operation of my improved system and apparatus for generating vapor in a rapid and economical manner, the essential feature of the improvement resides in the fact that I first produce combustion of properly selected fuel materials under high pressure, thereby generating products of combustion having a very high calorific intensity, and then leading said highly heated products of combustion in a continuous manner into the lower portion of a body of water into which they are projected in a subdivided condition, preferably from numerous orifices in a nozzle, and by which they are first brought into contact with the lower part of the body of water and during their ascent caused to come in contact with substantially every part of the body of water, thereby having opportunity to give up their heat energy to the water and generate steam therefrom in a rapid and efficient manner. At the same time the temperature of the gases is greatly reduced so that the resultant mixture of gases and steam which collect above the body of the water is under the desired pressure and at a sufficiently reduced temperature, relatively to the initial temperature of the products of combustion, that the mixture shall be suitable for use in engines and for other industrial purposes.

It will be evident that in the operation of my improved system, the pressure under which the products of combustion are generated within the combustion chamber is somewhat in excess of the pressure of the steam and gaseous mixture which is formed in the upper part of the generator and outside of the combustion chamber, so that the combustion chamber and the conduit leading therefrom to the lower portion of the water shall be normally maintained free of fluid and thereby not permit said fluid to backflow and impede the generation and movement of the heated gases. This is especially advantageous, in that accuracy of the admixture of the air and hydrocarbon fuel is not so essential under such conditions as where the fuel would be burned by the oxygen of air or steam in direct contact with the water. If the air or steam and the carbon or hydrocarbon element of the combustive processes were greater than necessary, they would be simply raised in their composite or dissociated form, as the case may be, to a relatively high temperature and act as conveyers of heat units from the combustion chamber to the body of water and hence would not be especially objectionable.

With the above and other objects in view, the nature of which will be more fully understood from the description hereinafter, the invention consists in the novel construction of the apparatus and in the method as hereinafter more fully described and defined in the claims.

Referring to the drawings: Figure 1 represents a sectional elevation of a vapor generator embodying my invention; and Fig. 2 represents a similar section of a modified form of the device.

1 designates the boiler shell provided with the crown 2 which is of annular form in order to communicate with the dome or steam chamber 3 which is formed in a suitable head 4 having its inner central portion provided with a nozzle chamber 5. This chamber is preferably interiorly tapered or contracted toward its lower end where it has connection with a conduit 6 which extends downwardly through the central portion of the boiler and connected at its lower end with a head 7 which seats in the bottom plate of the boiler. The head 7 forms a support for an inner lining 8 preferably of refractory material through which the hot products of combustion from the burner are adapted to pass. The conduit 6 with its lining of refractory material 8 constitutes, with the part 5, a combustion chamber. The lower end of the conduit 6 is controlled by a check valve member 9 of suitable form seating in the head 7 and having its guide stem 10 passing through the bottom plate 11 where it terminates in contact relation with a weighted lever 12 which tends to maintain the valve closed when the device is not in operation or in case of any great drop in the combustion pressure during the operation. The bottom plate 11 of the boiler is preferably cast with an upper plate 13 spaced therefrom to form a distributing chamber 14 into which the hot gases are discharged from the combustion chamber, and from which they pass by means of ports or apertures 15 in the plate 13 in subdivided state directly into the water contained within the boiler. The part 5 forms a chamber 17, in which the burner nozzle 16 is located, this chamber being closed at one side by an igniting cap 18 which is suitably clamped to the cap 4 by means, such as the ring 19 and fastening devices 20. 21 designates a casing inclosing the igniting cap 18 and forming a chamber 22 having outlets 23 through which the products from the combustion of the starting device are adapted to be discharged.

24 designates a suitable burner adapted to project a flame against the exterior of the cap 8 and initially heat the same so that the fuel mixture supplied from the burner nozzle 16 is ignited. The burner nozzle 16 in the present instance is mounted upon a pipe 25 passing through the head 4 and receiving a hydrocarbon mixture from the mixing tube 26, which is supplied with oil fuel from a pipe 27 and air or steam under pressure from a pipe 28. It will be understood that the fuel may be of hydrocarbon constitution supplied from any suitable source and also under pressure if so desired. The pipe 25 carries a hand wheel 29 or like means for manually turning the pipe 25 in order to reverse the position of the burner nozzle 16 after the gases have become initially ignited, in which case the burner occupies the position indicated in dotted lines and projects its flame directly into the shaped combustion chamber 8.

30 designates an outer covering for the shell 1 for the purpose of preventing the passage of radiant or other heat or heat producing rays, the natural tendency of which is to escape through the casing without giving up their energy to the water contained within the boiler. While I have, in the present instance, formed the covering 30 of lead and located exterior of the shell, it will be understood that any covering having the aforesaid qualifications may be employed, and that I am not limited to its exact location. 31 designates an auxiliary covering of heat insulating material surrounding the lead covering 30 to further retain heat within the walls of the shell and outside of this we also preferably provide a suitable fire brick setting 32. In this manner all of the heat energy produced is largely taken up by the water in the generation of steam. 33 designates a steam discharge pipe having communication with the chamber 3 and through which the steam and gaseous mixture in the generator is drawn off and delivered to a point of use and this pipe may have any suitable controlling means.

In Fig. 2, I have shown a modified form of burner and ignition device, wherein the combustion and burner chamber is located preferably wholly below the water level of the burner and substantially centrally disposed thereof, and in which the tubular conduit 34 thereof, through which the hot gases are conducted to the point of discharge, has its upper end 35 substantially spherical in form and inclosed by a fitting 36 to which the incoming pipe 37 for the fuel mixture and pipes 38 and 39 for the electrical conductors are connected. These pipes as here shown are passed through a suitable head 40 secured to the shell 1 and provided with stuffing boxes to prevent leakage, as will be understood. The pipe 38 preferably forms a conduit inclosing a second pipe 41 within which the insulated conductor 42 passes to one terminal of the electric arc circuit which serves to initially ignite the fuel mixture. The other terminal of the circuit 43 passes interiorly of the pipe 39 and has connection with a suitable electrode 44 arranged in close proximity to a similar electrode 45 of the conductor 42. The hydrocarbon is introduced into the pipe 37 by way of the pipe 46 and the air or steam is admitted through the pipe 47, the said mixture being discharged into the combustion chamber by way of the burner nozzle 48. In this embodiment of the invention I have shown two connections 49 and 50, through either of which the steam generated may be conducted to a point of use, or one may be utilized for connection with a safety valve as customary in steam boilers.

In describing the operation of the device, reference will first be had to the construction shown in Fig. 1 and it will be assumed that the boiler is filled with water to the required level. The auxiliary heating device 24 is lighted in order to heat the igniting cap 18 to the required high temperature necessary to ignite the mixture discharged from the burner nozzle 17. This burner, at the starting of the device, is turned so that it delivers the mixture directly into the cap 18 and against its heated walls, but after the mixture becomes properly ignited the burner nozzle is turned downwardly so as to project the flame directly into the combustion chamber 8, the auxiliary burner 24 at that time being extinguished. The combustion produces intense heat, and at a relatively high initial pressure passes down through the combustion chamber 8, opening the valve 9 so that the hot products are discharged through the ports or apertures 15 directly into the water in subdivided condition to generate steam.

It has been found that the burning of hydrocarbons under a considerable pressure, produced as here described, generates intense temperature and produces radiant rays of the X, radium or other varieties, the characteristics of which are to give off a great number of heat units. In the ordinary internal combustion boilers such heat units are not available for heating the water in view of the fact that the natural tendency of the radio-active rays is to pass through or penetrate the shell of the boiler and escape, whereby the water is deprived of a definite quantity of the radiant ray action and consequent loss of heat units desirable for the generation of steam. In my present invention I have provided a construction wherein these rays are trapped or held within the shell of the boiler by the impenetrable character of the lead or like covering 30 so that the heat units given off by these rays and ordinarily lost are retained and absorbed by the water in the production of steam.

The gases, passing into the water from the orifices 15, give up a large portion of their heat and at the same time said gases become cooled so that the admixture of steam and gases produced above the water is not excessively high in temperature.

In Fig. 2 the operation of the device is substantially similar to that described for Fig. 1, but instead of initially igniting the hydrocarbon mixture by a burner I have provided an electric arc by which the required degree of heat is initially obtained for starting purposes.

I have shown my improvements in the preferred form, but I do not restrict myself to the details shown as these may be modified or varied without departure from the spirit of my invention.

Having now described my invention, what I claim as new and desire to protect by Letters Patent is:

1. In an internal combustion generator, an inclosed water chamber having a steam dome at its top formed with a tubular central portion, combined with a detachable igniting cap tightly fitting the top of the steam dome over the tubular portion thereof, heating means surrounding the igniting cap whereby it may be raised to a state of high temperature, a tubular expansion from the tubular passage in the dome and having its lower end near the bottom of the water chamber and constituting with the tubular part of the steam dome a combustion chamber, means at the bottom of the water chamber for distributing the products of combustion in a subdivided condition, and means for supplying fuel and oxygen into the combustion chamber, comprising a nozzle within the combustion chamber, a rotary tubular part extending through the dome and by which the nozzle may be directed upward toward the igniting cap or downward into the combustion chamber, and means for supplying fuel and oxygen to the rotary tubular part.

2. In an internal combustion generator, an inclosd water chamber, combined with a combustion chamber arranged within the water space of the water chamber, means to provide an initial heating in the combustion chamber by conduction for igniting the fuel, said means comprising a closed extension of the combustion chamber externally heated, means for supplying fuel and oxygen to the said combustion chamber and the extension thereof whereby products of combustion may be produced under high pressure and temperature, and means for distributing the said highly heated products of combustion to the water at the lower part of the water chamber whereby they may intermingle with the water as they rise.

3. In an internal combustion generator, an inclosed water chamber, combined with a combustion chamber arranged within the water space of the water chamber, means to provide an initial heating in the combustion chamber for igniting the fuel, consisting of a closed igniting chamber forming a pocket from the combustion chamber into which the fuel supply may be projected and means to heat the said igniting chamber externally independently of the heat of the fuel supplied to the combustion chamber, means for supplying fuel and oxygen to the said combustion chamber whereby products of combustion may be produced under high pressure and temperature, and means for distributing the said highly heated products of combustion in subdivided condition to the water at the lower part of the water chamber whereby they may intermingle with the water as they rise.

4. In an internal combustion generator, an inclosed water chamber, combined with a combustion chamber arranged within the water space of the water chamber and having an externally heated igniting chamber extending therefrom, means comprising a nozzle, for supplying fuel and oxygen to the said combustion chamber whereby products of combustion may be produced under high pressure and temperature, means to rotate the nozzle so that the fuel is projected into the igniting chamber in starting the combustion and then projected in the combustion chamber during the period of normal operation of the apparatus, and means for distributing the said highly heated products of combustion to the water at the lower part of the water chamber whereby they may intermingle with the water as they rise.

5. In an internal combustion generator, an inclosed water chamber, combied with a combustion chamber arranged within the water space of the water chamber, means for supplying fuel and oxygen to the said combustion chamber whereby products of combustion may be produced under high pressure and temperature, a distributing chamber forming the entire lower part of the water chamber into which the said highly heated products of combustion are received from the combustion chamber and delivered to the water at the lower part of the water chamber in a form of great subdivision whereby they may intermingle intimately with the water as they rise, and a check valve arranged between the combustion chamber and the distributing chamber to prevent the back flow of water up into the combustion chamber.

6. In an internal combustion generator, an upright water chamber, a gas distributing device arranged over the entire bottom portion of the water chamber and providing a gas chamber having an upper annular wall provided with a large number of small perforations for discharging products of combustion into the bottom portion of the body of water at numerous places, a combustion chamber having communication with the gas chamber of the distributing device for supplying products of combustion thereto under pressure, means for supplying fuel and oxygen compound to the combustion chamber whereby it is burned therein under pressure, and means for initially igniting the fuel within the combustion chamber extending to and controlled from the outside of the generator.

7. In an internal combustion generator, an upright water chamber having at the bottom a gas distributing chamber of conical form having the upper surface formed with numerous perforations, said upper portion arranged at the bottom of the water chamber, combined with a combustion chamber arranged in the upper part of the water chamber above the water level therein and having a downwardly extending tubular part communicating with the central portion of the conical gas chamber, and means to supply fuel and air into the combustion chamber wherein it is burned under pressure and the products caused to pass downward for distribution to the water from the conical gas chamber.

8. In an internal combustion generator, a shell having a chamber formed in the bottom thereof provided with openings to discharge heated products of combustion into the water in the shell, a tubular member mounted on said bottom and having communication with said chamber, a check valve for said tubular member at its extreme bottom, mechanical means normally tending to positively close said valve, a burner for generating products of combustion under pressure and delivering them to said tubular member and said products adapted to open said valve by pressure, and an auxiliary heating device forming a pocket at the top of the combustion chamber and externally heated for initially igniting the mixture from said burner.

9. In an internal combustion generator, a water chamber having a hollow bottom provided with openings to discharge heated products into the water chamber for intimate contact with the water therein, a combustion chamber arranged within the water chamber having a pressure igniting cap mounted above the combustion chamber and extending to the outside of the water chamber to form an auxiliary ignition chamber for starting purposes, means for conveying the products of combustion from the combustion chamber to the hollow bottom of the water chamber, a hydrocarbon burner extending into the combustion chamber, means to shift the burner so that the hydrocarbon mixture may be either projected into said cap or into the combustion chamber, and means for initially heating said cap to ignite said hydrocarbon mixture.

In testimony of which invention, I hereunto set my hand.

FRANKLIN M. PATTERSON.

Witnesses:
 PERRY HAYNES,
 R. J. WALSH.